H. G. PAPE.
MECHANICAL MOVEMENT.
APPLICATION FILED MAR. 27, 1916.
1,190,451.
Patented July 11, 1916.
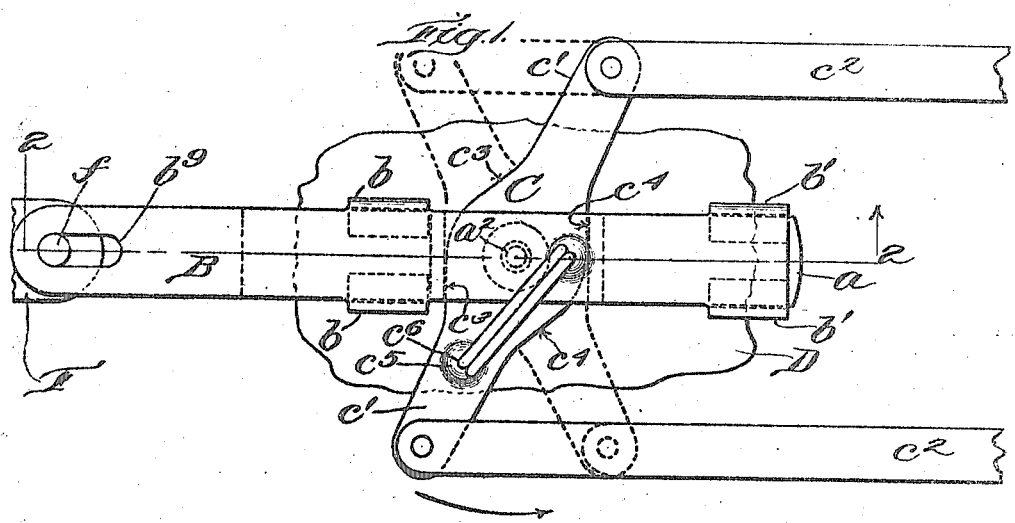
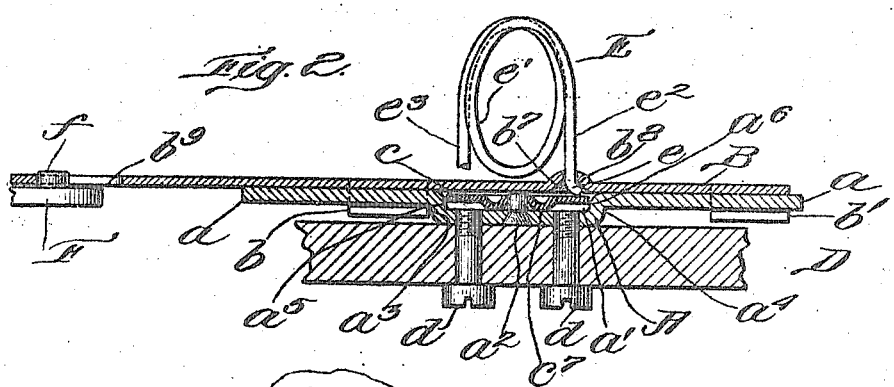
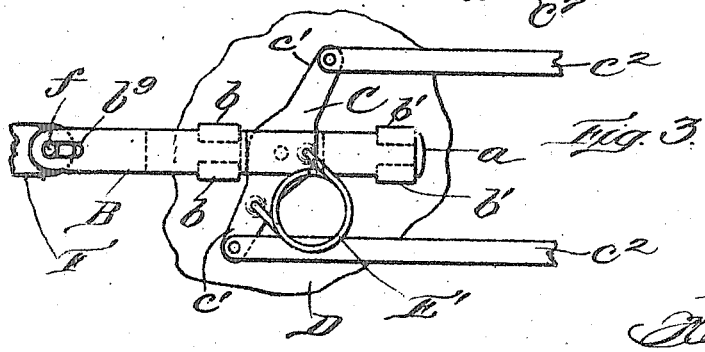
Inventor:
Herman G. Pape

UNITED STATES PATENT OFFICE.

HERMAN G. PAPE, OF NEW YORK, N. Y., ASSIGNOR TO RALPH A. SCHOENBERG, OF NEW YORK, N. Y.

MECHANICAL MOVEMENT.

1,190,451.  Specification of Letters Patent.  Patented July 11, 1916.

Application filed March 27, 1916. Serial No. 87,101.

*To all whom it may concern:*

Be it known that I, HERMAN G. PAPE, of New York city, in the county and State of New York, have invented a new and useful Mechanical Movement, of which the following is a specification.

The object of this invention is to provide a simple mechanical movement by means of which a driven member forming part thereof may be shifted back and forth with a quick snap movement by means of a driving member that is actuated, or intended to be actuated, by means which does not of itself impart a quick snap movement to the driven member.

My invention consists primarily in a mechanical movement for accomplishing the above and other objects and in the preferred form comprises a driving member mounted to move back and forth to a limited extent, a driven member mounted to move back and forth to a limited extent and a spring connecting said members which spring oscillates on an axis perpendicular to the direction of movement of one of said members.

Other features of my invention will be pointed out below.

In the drawings: Figure 1 is a plan view of my mechanical movement embodying my invention; Fig. 2 is a section on line 2—2 of Fig. 1; and Fig. 3 is a modification described below.

Having reference to the drawings A is a frame consisting of a strip of metal bent to provide a pair of wings $a$ which support and guide a driving member B and having a central recess or pocket $a'$ to receive a driven member C. The frame A may be fastened to any suitable supporting fixture D by means of screws $d$, $d$ as shown. At the middle of recess $a'$ the frame A is provided with a stud $a^2$ by means of which the driven member C is pivotally held within the recess, said recess being formed at its ends with two stop shoulders $a^3$ and $a^4$ coöperating, respectively, with abutment surfaces $c^3$ and $c^4$ to limit the swinging or oscillating movement of member C on stud $a^2$. The member C may, as shown, be provided with arms $c'$ connected by links $c^2$ with the device or devices that are to be controlled and actuated through the mechanical movement.

The driving member B is herein shown as a reciprocating bar formed with two pairs of hooked lugs $b$, $b$ and $b'$, $b'$ embracing wings $a$ so as to hold said driven member in place on frame A with provision for limited endwise movement thereon, the engagement of lugs $b$ and $b'$ with shoulders $a^5$ and $a^6$ serving to limit the movement of member A in both directions.

The member B is formed upon its under side with a recess $b^7$ into which a hole $b^8$ opens. One of the arms $c'$ of member C is likewise formed upon its under side with a similar recess at $c^5$ and with a similar hole $c^6$ opening into the same. Through the holes $b^8$ and $c^6$ extend the ends of a bow-spring E whose extremities are formed with hooks $e$ which hold said ends in engagement with the two members and against accidental displacement. This bow spring may be formed with one or more coils $e'$ at its middle if desired.

In order to reduce friction the hub portion of member C may be made upon its underside with an annular boss $c^7$ surrounding pivot stud $a^2$.

The driving member B may be reciprocated manually or otherwise but herein I have shown said member as connected by a pin $f$ and slot $b^9$ with an actuator F which may be a connecting rod driven at its opposite end by a crank (not shown).

In the drawings the connecting rod and member B are shown at the limit of their movements toward the right. When connecting rod F moves toward the left the pin $f$ carries member B with it and the movement of the latter toward the left carries the end $a^2$ of spring E toward pivot stud $a^2$ thereby either increasing the normal stress of spring E, if it has any, or putting said spring under increasing stress as the end $e^2$ travels up to stud $a^2$. As the end $e^2$ passes beyond stud $a^2$ the spring is under maximum stress and upon reaching a position upon the opposite side of stud $a^2$ the direction of the pressure of the end $e^3$ of spring E on member C has been shifted to such an angle that said pressure acts to swing member C in the direction of the arrow and this swinging movement of member C acts to shift the direction of the pressure of end $e^2$ on member B to such an angle as to accelerate the movement of member B and kick the latter to the extreme limit of its movement toward the left, the slot $b^9$ providing for relative movement at this time between member B and actuator F. It will be clear that this racing or jumping movement of member B takes place practically simultaneously with the start of the movement of member C and, in conjunction with the movement of member C, suddenly increases the effective pressure of spring E on member C. Thus immediately upon the start of member C the member B is jumped forward, the effective pressure of spring E is increased and the movement of member C accelerated from the very start thereof. In this way the driven member C is shifted from one position by a quick snap movement free of any creep, the engagement of the abutment surfaces $c^3$ and $c^4$ with the stop shoulder $a^3$ and $a^4$ limiting the movements of member C in both directions. The operation of the parts in snapping member C in the opposite direction, that is, back to the position shown in the drawing is merely the reverse of that described and will be clear without further description.

The mechanical movement shown in Fig. 3 operates in the same fashion as the movement shown in Figs. 1 and 2 and with one exception its construction is the same. This exception is that while the bow spring E of Figs. 1 and 2 is upright, the body of the corresponding spring E' of Fig. 3 is bent down into parallelism with members B and C for economy of space.

What I claim is:

1. A mechanical movement comprising a driving member, a driven member and a spring connecting said members which spring oscillates on an axis perpendicular to the direction of movement of one of said members.

2. A mechanical movement comprising a driving member, a driven member and a spring connecting said members which spring oscillates on an axis perpendicular to the direction of movement of said driving member.

3. A mechanical movement comprising a driving member, a driven member, and a spring connecting said members which spring oscillates on an axis perpendicular to the direction of movement of both of said members.

4. A mechanical movement comprising a driving member, a driven member, and a bow spring connecting said members which spring oscillates on an axis perpendicular to the direction of movement of one of said members.

5. A mechanical movement comprising a driving member, a driven member, and a spring connecting said members and put under stress in a plane at a right angle to one of said members and when released oscillating on an axis perpendicular to the direction of movement of one of said members.

6. A mechanical movement comprising a driving member having rectilinear reciprocating movement, a pivoted oscillating driven member and a spring connecting said members which spring oscillates on an axis perpendicular to the direction of movement of one of said members.

7. A mechanical movement comprising a driving member, a driven member, and a bow spring having hooked ends to retain it in engagement with said member, said driving member actuating the driven member by means of said spring.

8. A mechanical movement comprising a driving member, a driven member, a spring connecting said members which spring oscillates on an axis perpendicular to the direction of movement of one of said members; and means to limit the movement of the driven member.

9. A mechanical movement comprising a driving member movable back and forth, a driven member movable back and forth, and a spring connecting said members that is oscillated by the driving member in a direction parallel with the direction of movement of the driving member to operate the driven member.

10. A mechanical movement comprising a driving member and a driven member both movable back and forth in parallel planes and a spring connecting, and carried by, said members and oscillating on an axis perpendicular to the direction of movement of both of said members, the driven member, when moved in one direction acting first to put the spring under stress and thereafter to cause said spring to snap the driven member from one extreme of its movement to the opposite extreme.

11. A mechanical movement comprising a driving member and a driven member both movable back and forth in parallel planes and a spring connecting, and carried by, said members and oscillating on an axis perpendicular to the direction of movement of both of said members, the driven member, when moved in one direction acting first to put the spring under stress and thereafter to cause said spring to snap the driven member from one extreme of its movement to the opposite extreme and said spring serving to normally hold each member at the limit of its movement in one direction or the other.

12. A mechanical movement comprising a driving member; a driven member; and a spring actuated by said driving member and actuating said driven member which spring oscillates on an axis perpendicular to the direction of movement of one of said members.

HERMAN G. PAPE.